United States Patent
Neef et al.

(10) Patent No.: US 6,865,461 B2
(45) Date of Patent: Mar. 8, 2005

(54) METHOD AND DEVICE FOR CONTROLLING DRIVING DYNAMICS

(75) Inventors: Barbara Neef, Lehre (DE); Stefan Berkner, Flechorf (DE); Holger Duda, Meine (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 10/390,852

(22) Filed: Mar. 17, 2003

(65) Prior Publication Data

US 2004/0007412 A1 Jan. 15, 2004

(30) Foreign Application Priority Data

Mar. 15, 2002 (DE) .......................... 102 12 582

(51) Int. Cl.$^7$ .............................. B62D 6/00; G06F 7/00
(52) U.S. Cl. ................... 701/41; 280/5.5; 180/6.2
(58) Field of Search ................... 701/41; 280/5.5, 280/5.51; 477/1; 180/6.2

(56) References Cited

U.S. PATENT DOCUMENTS

| | | | |
|---|---|---|---|
| 4,706,771 A | 11/1987 | Kawabe et al. | |
| 4,874,054 A | 10/1989 | Watanabe | |
| 5,265,019 A | 11/1993 | Harara et al. | |
| 5,315,516 A | 5/1994 | Miller et al. | |
| 5,345,385 A | 9/1994 | Zomotor et al. | |
| 5,428,536 A | 6/1995 | Ackermann | |
| 5,487,009 A * | 1/1996 | Hill .............................. | 701/207 |
| 5,576,957 A | 11/1996 | Asanuma et al. | |
| 5,732,373 A | 3/1998 | Endo | |
| 5,925,083 A | 7/1999 | Ackermann | |
| 6,085,860 A | 7/2000 | Hackl et al. | |
| 6,449,542 B1 | 9/2002 | Böttiger et al. | |
| 6,648,426 B1 | 11/2003 | Böettiger et al. | |

FOREIGN PATENT DOCUMENTS

| | | |
|---|---|---|
| DE | 37 28 678 | 8/1987 |
| DE | 39 30 445 | 7/1990 |
| DE | 41 40 239 | 6/1991 |
| DE | 41 23 234 | 7/1991 |
| DE | 41 34 390 | 10/1991 |
| DE | 43 07 420 | 3/1993 |
| DE | 195 07 319 | 3/1995 |
| DE | 196 15 377 | 4/1996 |
| DE | 195 15 051 | 5/1996 |
| DE | 195 15 055 | 5/1996 |
| DE | 195 15 057 | 5/1996 |
| DE | 195 15 059 | 5/1996 |
| DE | 195 15 061 | 5/1996 |
| DE | 196 07 429 | 9/1997 |
| DE | 197 51 227 | 11/1997 |
| DE | 198 12 238 | 3/1998 |
| DE | 41 33 238 | 9/2001 |
| EP | 0 474 130 | 3/1992 |
| EP | 0 846 610 | 12/1997 |
| EP | 1 000 838 | 10/1999 |

* cited by examiner

*Primary Examiner*—Yonel Beaulieu
(74) *Attorney, Agent, or Firm*—Kenyon & Kenyon

(57) ABSTRACT

In a method and device for controlling driving dynamics, at least one steering action at a vehicle axle being controlled, a driving-dynamics setpoint, which is described by at least a yaw-dynamics setpoint, being ascertained, a steering-angle precontrol value being determined on the basis of the driving-dynamics setpoint, using a model of the controlled system, the driving state, which is described by at least the yaw rate, being ascertained, at least one steering-angle correction value being ascertained, based on the deviation of the actual yaw rate from a setpoint yaw rate, and the steering action being defined by the steering-angle precontrol value and the at least one steering-angle correction value.

19 Claims, 3 Drawing Sheets

METHOD AND DEVICE FOR CONTROLLING DRIVING DYNAMICS

CROSS-REFERENCE TO RELATED APPLICATIONS

The present application claims priority to Application No. 102 12 582.1, filed in the Federal Republic of Germany on Mar. 15, 2002, which is expressly incorporated herein in its entirety by reference thereto.

FIELD OF THE INVENTION

The present invention relates to a method and a device for controlling driving dynamics, which, using steering intervention, control at least one variable representing the driving dynamics.

BACKGROUND INFORMATION

It is conventional that the control of the variables describing the driving dynamics, such as sideslip angle, angular velocity of sideslip, and/or yaw rate, allows an improved vehicle stability to be attained. In this context, these values cannot be acted upon directly, but rather the performance can only be controlled indirectly with the aid of control variables. Possible control variables for intervening in the driving dynamics include, for example, steering angle, braking forces, and/or spring stiffnesses of the wheel suspensions.

In particular, in the case of so-called steer-by-wire systems, the connection between the steering wheel and steering intervention is separated at the axles. Such a separation allows automatic corrections of the steering-wheel inputs of the driver for steering intervention at the axles.

Thus, it is described, for example, in U.S. Pat. No. 4,706,771 that one can intervene in the driving dynamics via the front-axle and/or rear-axle steering systems. The control-variable setpoint for the steering intervention is calculated on the basis of a setpoint yaw behavior and/or a setpoint sideslip angle, in light of a vehicle model for a stationary driving state determined by the driving speed and the desired steering. The stationary driving state is the driving state, which may be determined for a vehicle at an operating point defined on the basis of a driving speed and/or a curve radius. Such precontrol does not allow a rapid reaction to driving conditions that change due to, e.g. a change of roadway pavement.

It is an object of the present invention to provide a method and a device for robustly controlling the driving dynamics, using steering actions at at least one axle, which may allow a rapid reaction to dynamic changes in driving conditions.

SUMMARY

The above and other beneficial objects of the present invention may be achieved by providing a method and a device as described herein.

The driving dynamics of a vehicle, which are described by the yaw dynamics, are controlled at a vehicle axle by steering intervention; a driving-dynamics setpoint described by at least a yaw-dynamics setpoint being determined, a steering-angle precontrol value being determined on the basis of the driving-dynamics setpoint, using a model of the controlled system, the driving state described by at least the yaw rate being determined, at least one steering-angle correction value being determined on the basis of the deviation of the yaw rate from a setpoint yaw rate, and the steering intervention being defined by the steering-angle precontrol value and the at least one steering-angle correction value.

The yaw dynamics of a vehicle are influenced by steering actions. This relationship is the controlled system of the present task. Linearization and/or decoupling of the controlled system may be achieved by the steering-angle precontrol value. An optimum controller may then be arranged for the present, decoupled control variables. The error dynamics of the controlled system may be selectively influenced by the selection of the controller for the calculation of the steering-angle correction value, so that robust control of the yaw dynamics may be achieved. This may allow, for example, a marked increase in the yaw damping at high vehicle speeds.

In an example embodiment, the driving-dynamics setpoint is calculated as a function of the predetermined or given steering angle and the current vehicle speed, using a model of the controlled system. The dynamic calculation of the setpoint variables may allow the driving-dynamics setpoint to be effectively adapted to the present driving state or conditions.

In another example embodiment, the calculation of the steering-angle precontrol value includes the inversion of the controlled system. This inversion may allow a necessary steering action for the attainment of the driving-dynamics setpoint to be calculated.

At least one model of the controlled system may be necessary for the use of such a model-following control system. An example model is the linear, single-track model, which may not take dynamic tire effects into consideration and may allow the most important dynamic characteristics to be portrayed. The neglect of further effects may allow a compact formulation, so that the number of necessary computational steps may be minimized.

However, special applications may require that further effects be considered. The model may be correspondingly expanded for this purpose, e.g., by considering dynamic tire effects.

In another example embodiment, steering intervention may additionally be provided on a second vehicle axle. In addition to the yaw rate, this may allow a further variable, e.g., the sideslip angle, to be controlled, which may result in a further improvement of the directional stability. To this end, the driving-dynamics setpoint is described by the yaw dynamics setpoint and a sideslip-angle dynamics setpoint. The driving state to be determined includes the sideslip angle and the yaw rate.

The sideslip angle is not directly measurable, but may be described by a nonlinear, first-order differential equation, as a function of measured variables. In an example embodiment, sideslip angle $\hat{\beta}$ may be ascertained by a sideslip-angle approximation method, which combines a first calculation of sideslip angle $\beta_{lin}$ by solution of the linear or linearized, first-order differential equation, and a second calculation of sideslip angle $\beta_{nl}$ by direct integration, i.e., a numerical integration of a nonlinear, first-order differential equation, using a suitable fusion method, e.g., by a weighted addition.

The nonlinear differential equation may only be solved by numerical approximation methods. In order to counteract problems of the integration, a filter term H(e) may be introduced for feedback or a feedback loop that is a function of the driving state.

The functional values of the feedback gain or amplification H=H(e) are adjusted by conducting tests on the vehicle under different driving conditions and/or different boundary conditions. Apart from the driving state, special, vehicle-specific features and/or road-surface characteristics, e.g., wet or icy road conditions and/or a special road-surface covering, may have an effect on the functional values. The values are stored in the form of tables and are thus available to the state monitor during vehicle operation.

In addition to such tuning with the aid of driving tests, other methods are also possible for adapting amplification H(e), e.g., the use of learning algorithms or an optimization by a simulation calculation and/or combinations.

In a further step, weighting factors w are adapted for the special type of vehicle. In this connection, the method is adapted to the vehicle type, using driving tests. However, other methods are also possible, e.g., the use of learning algorithms or adaptation methods.

The determination of the driving state described by the sideslip angle and the yaw rate is not limited to the described application. Rather, the attitude-angle estimator may be combined with any driving-dynamics control system or electronic stability program, which controls the driving state described by at least the sideslip angle and yaw rate, using any control action, such as steering intervention, braking forces, and/or wheel slip, etc.

The present invention is described below on the basis of exemplary embodiments.

DETAILED DESCRIPTION

Figure 3:
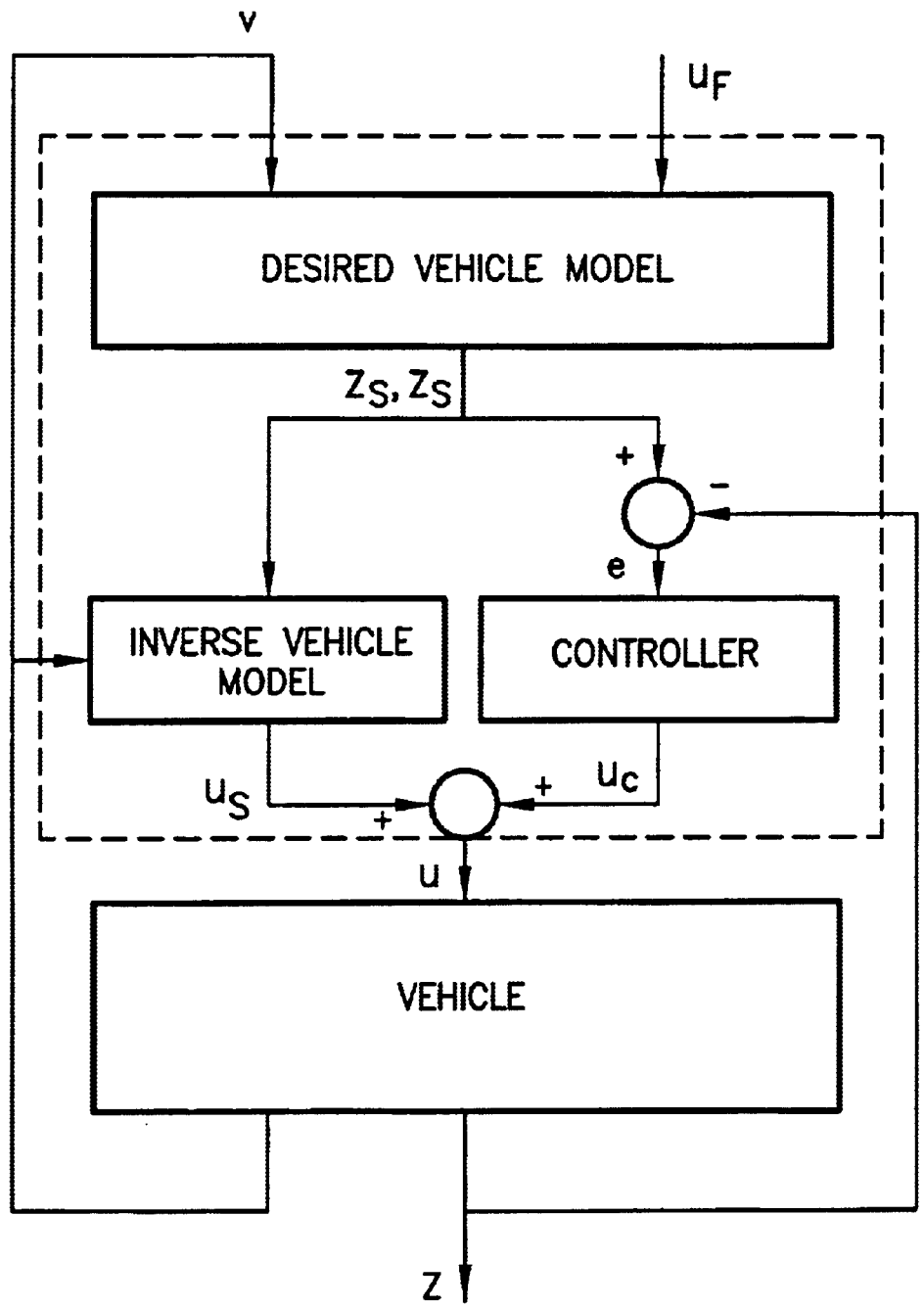
FIG. 3 is a schematic block diagram of the model-following control system.

The block diagram of a model-following control system for a control action u at a vehicle is illustrated in FIG. 3. The real vehicle is symbolized by the unit "vehicle". The model-following control system includes the units "vehicle model", "inverse vehicle model", and "controller".

The relationship between a vehicle variable z to be controlled and the control variables u is describable by the dynamic model of a vehicle:

$$\dot{z} = A(v)z + Bu \quad (1.1)$$

using the linear system matrix A(v), which is a function of, inter alia, driving speed v, and control matrix B. The desired dynamic performance of a vehicle is given by the equation $$\dot{z}_S = A_S(v)z_S + B_S u_F \quad (1.2)$$

having a desired steering $u_F$ specified, for example, by the driver, and matrices $A_s$, $B_s$ by which setpoint characteristics of the vehicle are definable. In the unit "desired vehicle model", this equation is used to determine setpoint variables $z_S, \dot{z}_S$ on the basis of specified desired steering $u_F$ for a stationary driving state that is, for example, determined by driving speed v.

The deviation of setpoint variable $z_s$ and actual variable z is designated by error $e = z_S - z$.

In the model-following control system, control action u is made up of a precontrol term $u_s$ and a correction term $u_c$: $u = u_s + u_c$ In the controller, correction term $u_c$ is determined, for example, by an amplification matrix:

$$U_c = K e$$

In the unit "inverse vehicle model", precontrol term us is calculated, using the inverse vehicle model. An inversion of the actual controlled system described by equation (1.1) may be necessary for this. A desired control action may be calculated by inserting the calculated setpoint variables $z_S$, $\dot{z}_S$:

$$u_S = B^{-1}(\dot{z}_S - A(v)z_S)$$

It is possible to invert control matrix B, when it is regular. Therefore, the dynamic vehicle model may be appropriately selected.

Matrices A and $A_s$ and B and $B_s$ may not necessarily be identical. Therefore, setpoint intervention $u_S$ may deviate from desired intervention $u_F$, based on the consideration of current system state z, as well.

The error equation of the system results from inserting setpoint intervention $u_S$ and correction term $u_c = Ke$ into the motion equation of the vehicle:

$$e_s = -BKe$$

Therefore, the error behavior may be optimized by appropriately selecting amplification matrix K. The equation is linear, so that methods of linear, quadratic optimization may be used for the optimization calculation.

Figure 1A:
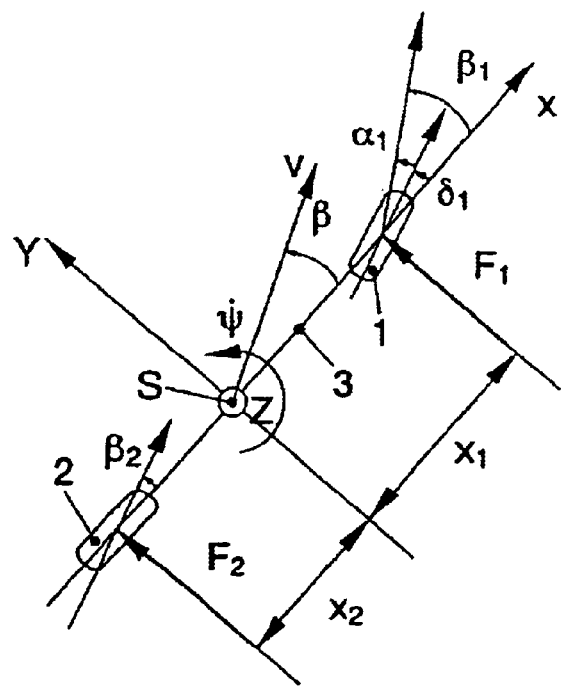
FIG. 1a is a schematic view of a linear, single-track model in the case of front-axle steering.

The quality of the model-following control system may be highly dependent on the quality of the vehicle model used. The basis for the modeling of the vehicle is the linear, single-track model illustrated in FIG. 1a for a vehicle having front-axle steering, wheels of the front axle being reduced to one wheel 1 and wheels of the rear axle being reduced to one wheel 2. Center of gravity S of the vehicle is the origin of an x-y-z coordinate system. The distances of wheels 1, 2 from center of gravity S are $x_1$, $x_2$. The control-action variable for a front-axle steering system is a steering angle $\delta_1$ at wheel 1. The angle between longitudinal vehicle axis 3 and the direction of vehicle speed v is sideslip angle $\beta$. The motion about vertical vehicle axis z is described by yaw rate $\dot{\psi}$. The sideslip angles at wheels 1,2 are therefore:

$$\beta_1 = \beta + \frac{x_1}{v}\dot{\psi}, \; \beta_2 = \beta - \frac{x_2}{v}\dot{\psi}$$

In the case of steering intervention at the front axle, the following applies to the slip angle between the wheel position and the direction of travel: $\alpha_1 = \beta - \delta_1$, $\alpha_2 = \beta_2$ Lateral forces $F_1$ and $F_2$ act upon the wheels in transverse vehicle direction y. Forces $F_1$ and $F_2$ are calculated, using slip stiffness $c_{\alpha,i}$ and slip angle $\alpha_i$:

$$F_i = c_{\alpha,i} \alpha_i$$

Using moment of inertia about the z at axis $J_z$, the principle of angular momentum at the center of gravity of the vehicle provides that:

$$J_z \ddot{\psi} = F_1 x_1 - F_2 x_2$$

Using a linear, single-track model having the setpoint characteristics denoted by a subscript "S", a general equation for yaw-dynamics setpoint $\psi_S, \dot{\psi}_S$ as a function of desired steering $\delta_F$ is:

$$\ddot{\psi}_S = \frac{c_{\alpha 1,S} x_{1,S}^2 + c_{\alpha 2,S} x_{2,S}^2}{J_{z,S} v}\dot{\psi}_S + \frac{c_{\alpha 1,S} x_{1,S} + c_{\alpha 2,S} x_{2,S}}{J_{z,S} v}\beta_S - \frac{c_{\alpha 1,S} x_{1,S}}{J_{z,S}}\delta_F \quad (2.1)$$

This differential equation may be solved analytically, using conventional methods.

Setpoint steering action $\delta_{s,1}$ at the front axle may be calculated as a function of yaw-dynamics setpoint $\psi_S, \dot{\psi}_S$ determined by solving equation (2.1):

$$\delta_{S,1} = \beta_1(\dot{\psi}_S) - \frac{J_z \ddot{\psi}_S + c_{\alpha 2}\beta_2(\dot{\psi}_S)x_2}{c_{\alpha 1}x_1} \quad (2.3)$$

Corrected setpoint steering action $\delta_1$ at the front axle is obtained by combining setpoint steering action $\delta_{S,1}$ with a control term $\delta_{C,1}$. A conventional PID controller may be used, for example, to determine the control term.

The yaw dynamics are selectively controllable by intervention at the front axle. This allows, for example, a marked increase in the yaw damping to be attained at high vehicle speeds.

Figure 2A:
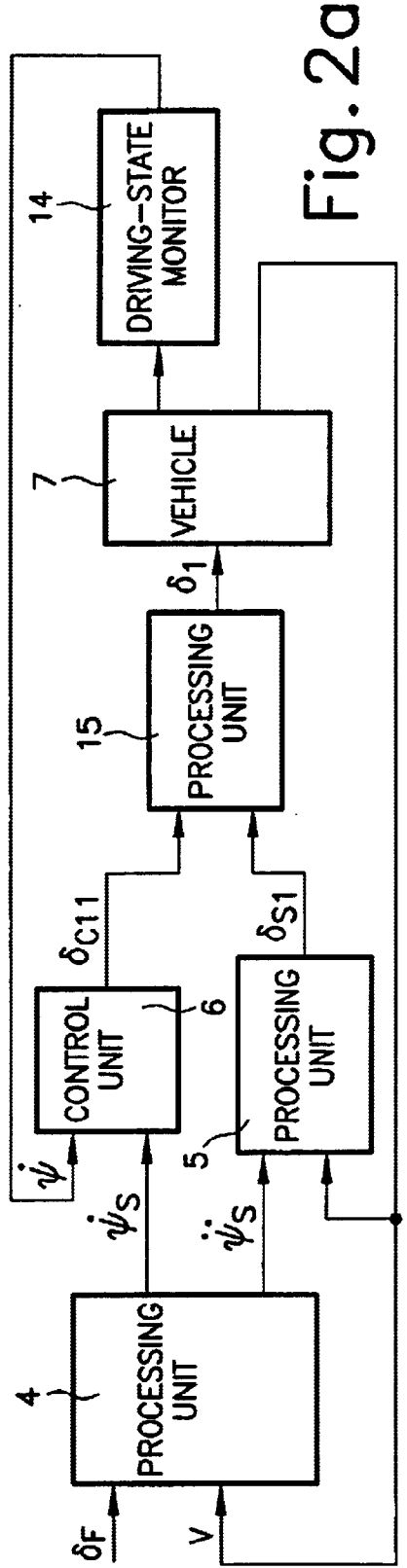
FIG. 2a is a schematic representation of the model-following control in the case of front-axle steering.

FIG. 2a is a schematic view of the steering intervention for a vehicle 7 having front-axle steering, including processing units 4, 5, and 15, a driving-state monitor 14, and a control unit 6. In this context, each of units 4, 5, 15, 14, and 6 may be configured to have its own processor, or they may be configured to have one or more common processors. The driving state described by the yaw rate is ascertained by driving-state monitor 14, which takes the form of a sensor unit and/or processing unit.

In processing unit 4, yaw-dynamics setpoint $\psi_S, \dot{\psi}_S$ are determined as a function of desired steering $\delta_F$ and driving speed v by solving equation (2.1). The precontrol term or setpoint steering action $\delta_{S,1}$ at the front axle is calculated in processing unit 5 by solving equation (2.2) on the basis of setpoint yaw acceleration $\dot{\psi}_S$ and driving speed v. In control unit 6, a correction term $\delta_{C,1}$ is calculated on the basis of the deviation of the yaw rate from the setpoint yaw rate. The steering action determined in processing unit 15 is supplied to vehicle 7.

The yaw-dynamics setpoint is determined on the basis of a given steering angle and a dynamic, desired vehicle model. In order to adhere to this yaw-dynamics setpoint on the real vehicle, a precontrol term and a control term are determined. The precontrol term is determined, using the inverse of the real vehicle model.

In place of the steering intervention at the front axle, steering intervention may also be realized an the rear axle. The setpoint steering actions result from corresponding adjustments of slip angles $\alpha_1 = \beta_1$, $\alpha_2 = \beta_2 - \delta_2$.

Figure 1B:
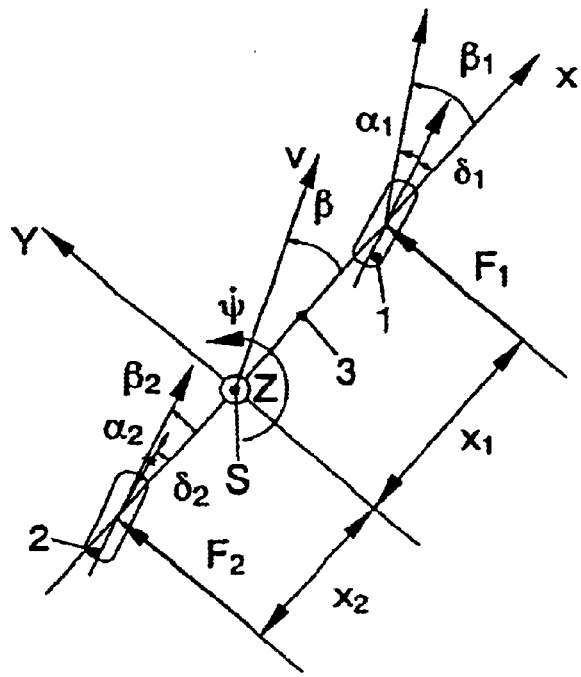
FIG. 1b is a schematic view of a linear, single-track model in the case of front-axle and rear-axle steering.

A further improvement in the directional stability may be realized by simultaneously controlling the sideslip angle and the yaw dynamics, using steering action at the front and rear axles. A vehicle having front-axle and rear-axle steering is illustrated in FIG. 1b. The designations here correspond to FIG. 1a. In addition to the front-axle steering intervention illustrated in FIG. 1a, a steering angle $\delta_2$ is applied to wheel 2.

The vehicle-dynamics setpoint may be described by equation (1.2). Using a linear, single-track model having the setpoint characteristics designated by subscript "S", the following equation applies:

$$\begin{pmatrix} \dot{\beta}_S \\ \ddot{\psi}_S \end{pmatrix} = \begin{bmatrix} a_{11,S} & a_{12,S} \\ a_{21,S} & a_{22,S} \end{bmatrix} \begin{pmatrix} \beta_S \\ \dot{\psi}_S \end{pmatrix} + \begin{bmatrix} b_{11,S} & b_{12,S} \\ b_{21,S} & b_{22,S} \end{bmatrix} \begin{pmatrix} \delta_{F,1} \\ \delta_{F,2} \end{pmatrix} \quad (3.1)$$

wherein:

$$a_{11,S} = \frac{c_{\alpha 1,S} + c_{\alpha 2,S}}{m_S v}, \; a_{12,S} = \frac{c_{\alpha 1,S}x_{1,S} - c_{\alpha 2,S}x_{2,S}}{m_S v^2} - 1$$

$$a_{21,S} = \frac{c_{\alpha 1,S}x_{1,S} - c_{\alpha 2,S}x_{2,S}}{J_{z,S}}, \; a_{22,S} = \frac{c_{\alpha 1,S}x_{1,S}^2 + c_{\alpha 2,S}x_{2,S}^2}{J_{z,S}v}$$

$$b_{11,S} = -\frac{c_{\alpha 1,S}}{m_S v}, \; b_{12,S} = -\frac{c_{\alpha 2,S}}{m_S v},$$

$$b_{21,S} = -\frac{x_{1,S}c_{\alpha 1,S}}{J_{z,S}}, \; b_{22,S} = \frac{x_{2,S}c_{\alpha 2,S}}{J_{z,S}}$$

This first-order differential equation may be solved analytically, when desired steering actions $\delta_{F,1}$, $\delta_{F,2}$ are input. Desired steering actions $\delta_{F,1}$, $\delta_{F,2}$ at the front and rear axles are determined as a function of the vehicle type, e.g., based on a steering-wheel angle.

The real vehicle is generally described by differential equation (1.1). By transforming this differential equation, one obtains the inverse vehicle model for calculating a control-action setpoint as a function of the desired dynamics $z_S, \dot{z}_S$:

$$u_S = B^{-1}(\dot{z}_S - A(v)z_S) \quad (3.2)$$

Using the linear one-track model, control-action setpoints $\delta_{S,1}$, $\delta_{S,2}$ at the front and rear axles may be calculated:

$$\delta_{S,1} = \beta_1 - \frac{J_z \ddot{\psi}_S + (\beta + \dot{\psi})mvx_2}{c_{\alpha 1}(x_1 + x_2)} \quad (3.3)$$

$$\delta_{S,2} = \beta_2 + \frac{J_z \ddot{\psi}_S - (\beta + \dot{\psi})mvx_1}{c_{\alpha 1}(x_1 + x_2)} \quad (3.4)$$

Figure 2B:
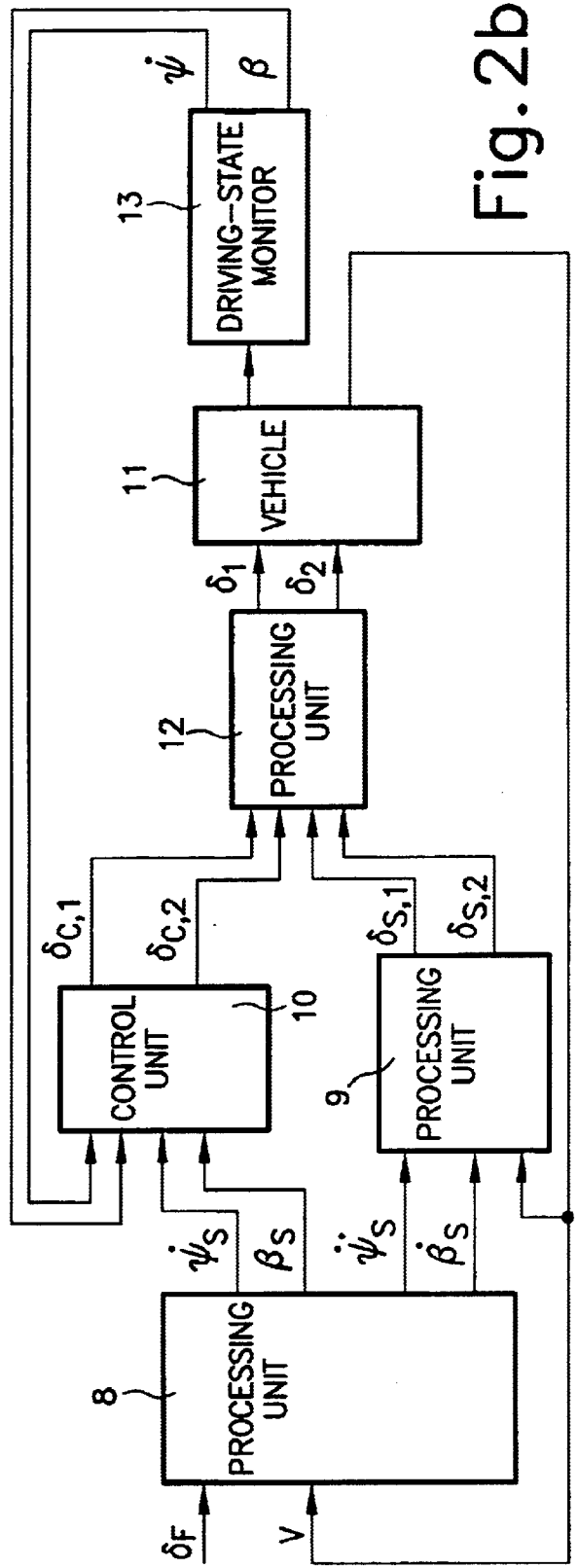
FIG. 2b is a schematic representation of the model-following control in the case of front-axle and rear-axle steering.

FIG. 2b is a schematic view of steering intervention in the case of front-wheel and rear-wheel steering, including processing units 8, 9, and 12, a control unit 10, a driving-state monitor 13, and a vehicle 11. Units 8, 9, 10, 12, and 13 may either be manufactured separately or in common modules. In processing unit 8, setpoint dynamics $\psi_S$, $\dot{\psi}_S$, $\dot{\beta}_S$, $\beta_S$ are determined as a function of desired steering $\delta_F$ and driving speed v by solving equation (3.1). The precontrol terms or setpoint steering intervention $\delta_{S,1}$, $\delta_{S,2}$ at the front and rear axles are calculated in processing unit 9 by solving the equation of the inverse vehicle model (3.2), based on setpoint yaw acceleration $\dot{\psi}_S$, setpoint angular sideslip velocity $\dot{\beta}_S$, and traveling speed v. The yaw rate and the sideslip angle are ascertained in driving-state monitor 13. In this context, the sideslip angle is determined by a suitable estimation method. In control unit 10, correction terms $\delta_{C,1}$ and $\delta_{C,2}$ are determined, based on the deviation of the state variables ascertained in driving-state monitor 13, from the setpoint variables ascertained in processing unit 8. In a processing unit 12, the correction terms and the precontrol terms are added up to form a steering action, which is supplied to vehicle 11.

For the model-following control system, a desired dynamic performance is determined with the aid of a desired vehicle model. In order to maintain these desired dynamics, setpoint interventions are determined, using a model of the controlled system and additional control actions. The use of "previous knowledge" to ascertain the control actions reduces the amount of control activity to be started and, in this manner, increases the ride comfort and the driving safety.

What is claimed is:

1. A method for controlling driving dynamics, comprising:
   controlling at least one steering action of a vehicle axle;
   ascertaining a driving-dynamics setpoint described by at least a yaw-dynamics setpoint;
   determining a steering-angle precontrol value in accordance with the driving-dynamics setpoint using a model of a controlled system;
   ascertaining a driving state at least described by a yaw rate;
   determining at least one steering-angle correction value in accordance with a deviation of the yaw rate from a setpoint yaw rate; and
   defining the steering action in accordance with the steering-angle precontrol value and the at least one steering-angle correction value.

2. The method according to claim 1, wherein the driving-dynamics setpoint ascertaining step includes calculating the driving-dynamics setpoint as a function of a predetermined steering angle and a current vehicle speed using the model of the controlled system.

3. The method according to claim 1, wherein the steering-angle precontrol determining step includes an inversion of the controlled system.

4. The method according to claim 3, wherein the model of the controlled system includes a linear, single-track model without consideration of dynamic tire effects.

5. The method according to claim 3, wherein the model of the controlled system includes a linear, single-track model including dynamic tire effects.

6. The method according to claim 1, further comprising:
   providing a steering action at at least two vehicle axes, the driving-dynamics setpoint including at least the yaw-dynamics setpoint and a sideslip-angle dynamics setpoint, a description of the driving state including at least a sideslip angle and a yaw rate; and
   determining a second steering-angle correction value in accordance with a deviation of the sideslip angle from a setpoint sideslip angle.

7. The method according to claim 6, further comprising determining the sideslip angle including calculation of a first sideslip angle by solving at least one of a linear and a linearized, first-order differential equation, calculation of a second sideslip angle by solving a nonlinear, first-order differential equation and fusion of the calculated first sideslip angle and second sideslip angle to form an estimated value.

8. The method according to claim 7, wherein the fusion includes a weighted addition.

9. The method according to claim 7, wherein the nonlinear differential equation is solved in the sideslip angle determining step by numerical integration, the nonlinear differential equation expanded by at least a filter term.

10. A device for controlling the driving dynamics of a vehicle, comprising:
    control elements configured to perform a steering action at at least one axle;
    a first processing unit configured to ascertain a driving-dynamics setpoint at least described by a yaw-dynamics setpoint;
    a second processing unit configured to calculate a steering-angle precontrol value in accordance with the driving-dynamics setpoint and a model of a controlled system;
    a driving-state monitor configured to ascertain a driving state at least described by a yaw rate;
    a control unit configured to ascertain at least one steering-angle correction value adapted to control yaw dynamics in accordance with a deviation of the yaw rate from a setpoint yaw rate; and
    a third processing unit configured to define the steering action in accordance with the steering-angle precontrol value and the at least one steering-angle correction value.

11. The device according to claim 10, wherein the first processing unit is configured to calculate the driving-dynamics setpoint as a function of a given steering angle and a current vehicle speed in accordance with a desired model of the controlled system.

12. The device according to claim 10, wherein the second processing unit is configured to invert the controlled system.

13. The device according to claim 12, wherein each of the first processing unit and the second processing unit is configured to model the controlled system as a linear, single-track model without consideration of dynamic tire effects.

14. The device according to claim 12, wherein each of the first processing unit and the second processing unit is configured to model the controlled system as a linear, single-track model including dynamic tire effects.

15. The device according to claim 10, wherein the vehicle includes control elements configured to perform steering action at at least two vehicle axes, the first processing unit configured to ascertain at least the yaw-dynamics setpoint and a sideslip-angle dynamics setpoint, the driving-state monitor configured to ascertain at least one sideslip angle and the yaw rate, the control unit configured to ascertain a second steering-angle correction value in accordance with a deviation of the sideslip angle from a setpoint sideslip angle.

16. The device according to claim 15, wherein the driving-state monitor is configure to perform a sideslip-angle estimation including a calculation of a first sideslip angle by solving at least one of a linear and a linearized, first-order differential equation, a calculation of a second sideslip angle by solving a nonlinear, first-order differential equation and a fusion of the calculated first and second sideslip angles to form an estimated value.

17. The device according to claim 16, wherein the fusion includes a weighted addition.

18. The device according to claim 16, wherein the driving-state monitor is configured to solve the nonlinear differential equation by numerical integration, the nonlinear differential equation expanded by at least a filter term.

19. A device for controlling driving dynamics of a vehicle, comprising:
    means for performing a steering action at at least one axle;
    means for ascertaining a driving-dynamics setpoint at least described by a yaw-dynamics setpoint;
    means for calculating a steering-angle precontrol value in accordance with the driving-dynamics setpoint and in accordance with a model of a controlled system;
    means for ascertaining a driving state at least described by a yaw rate;
    means for ascertaining at least one steering-angle correction value for controlling yaw dynamics in accordance with a deviation of the yaw rate from a setpoint yaw rate; and
    means for defining the steering action in accordance with the steering-angle precontrol value and the at least one steering-angle correction value.

* * * * *